March 5, 1935.  E. W. BITZER ET AL  1,992,987
SPRING TESTER
Filed June 11, 1932  2 Sheets-Sheet 1

INVENTORS
Edward W. Bitzer
Herbert W. Johnson
BY Chappell Earl
ATTORNEYS

March 5, 1935.  E. W. BITZER ET AL  1,992,987

SPRING TESTER

Filed June 11, 1932  2 Sheets-Sheet 2

INVENTORS
Edward W. Bitzer
Herbert W. Johnson
BY Chappell & Earl
ATTORNEYS

Patented Mar. 5, 1935

1,992,987

UNITED STATES PATENT OFFICE 1,992,987

SPRING TESTER

Edward W. Bitzer and Herbert W. Johnson, Muskegon, Mich.

Application June 11, 1932, Serial No. 616,632

17 Claims. (Cl. 73—51)

REISSUED

This invention relates to improvements in spring testers. The tester, of course, is available for testing or gauging any article to which it might be applied to determine whether or not a surface is exactly square and true.

The object of the invention is to determine the trueness and accuracy of construction of a coil spring such as a valve spring. Valve springs especially should be so constructed as to exert an even pressure on all sides of the valve or an exactly central pressure, so that the valve will seat and close effectively at all points of its circumference.

Objects pertaining to details and economies of construction and operation will appear from the description to follow. Preferred embodiments of our invention are illustrated in the accompanying drawings, in which:

Fig. 4 is an enlarged detail view of the swivel testing head and parts showing the head tipped to an extreme position.

Fig. 5 is a detail sectional view of a modified construction of the swivel head, in which a single ball bearing is utilized.

Fig. 6 is a similar detail sectional view of another modification of swivel test head in which a conically pointed bearing and corresponding seat is utilized.

Fig. 7 is a still further modification of swivel test head in which a crossed knife edge bearing is utilized.

Fig. 8 is a vertical detail sectional view on line 8—8 of Fig. 7, showing details of construction.

The parts will be identified by their numerals of reference which are the same in all the views.

1 is the base. 2 is the standard carried thereby and 3 is the head for supporting the column carrying the swivel test head. 4 is the test plunger with a disk-like head 41 at the top carrying a guide 42 for the bottom coil of a spring being tested. This guide is removable and may be replaced by one of suitable size to test any spring or article under test.

Figure 1:
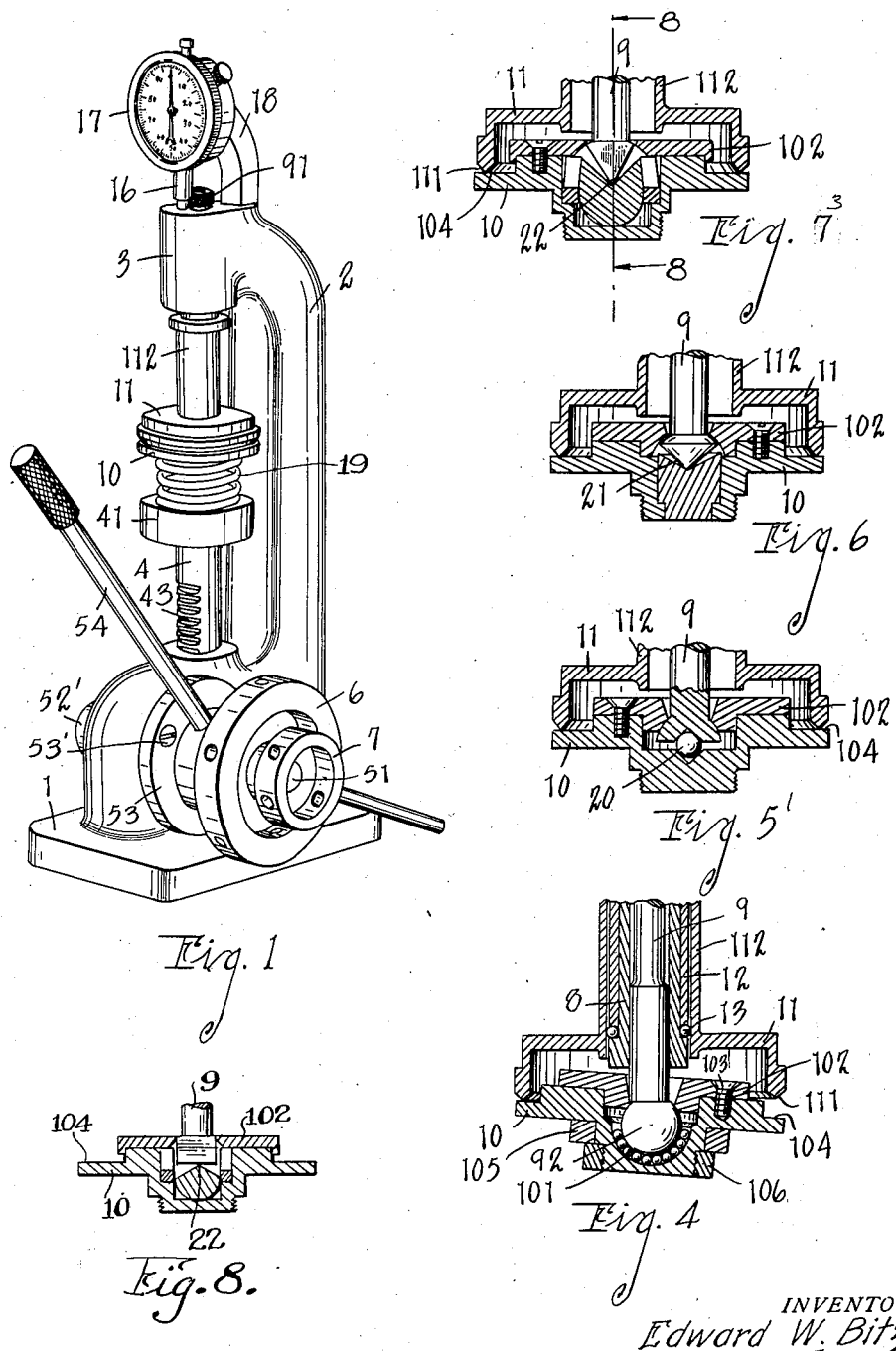
Fig. 1 is a perspective view of our improved spring tester with a spring in position under compression.
Figures 2, 3:
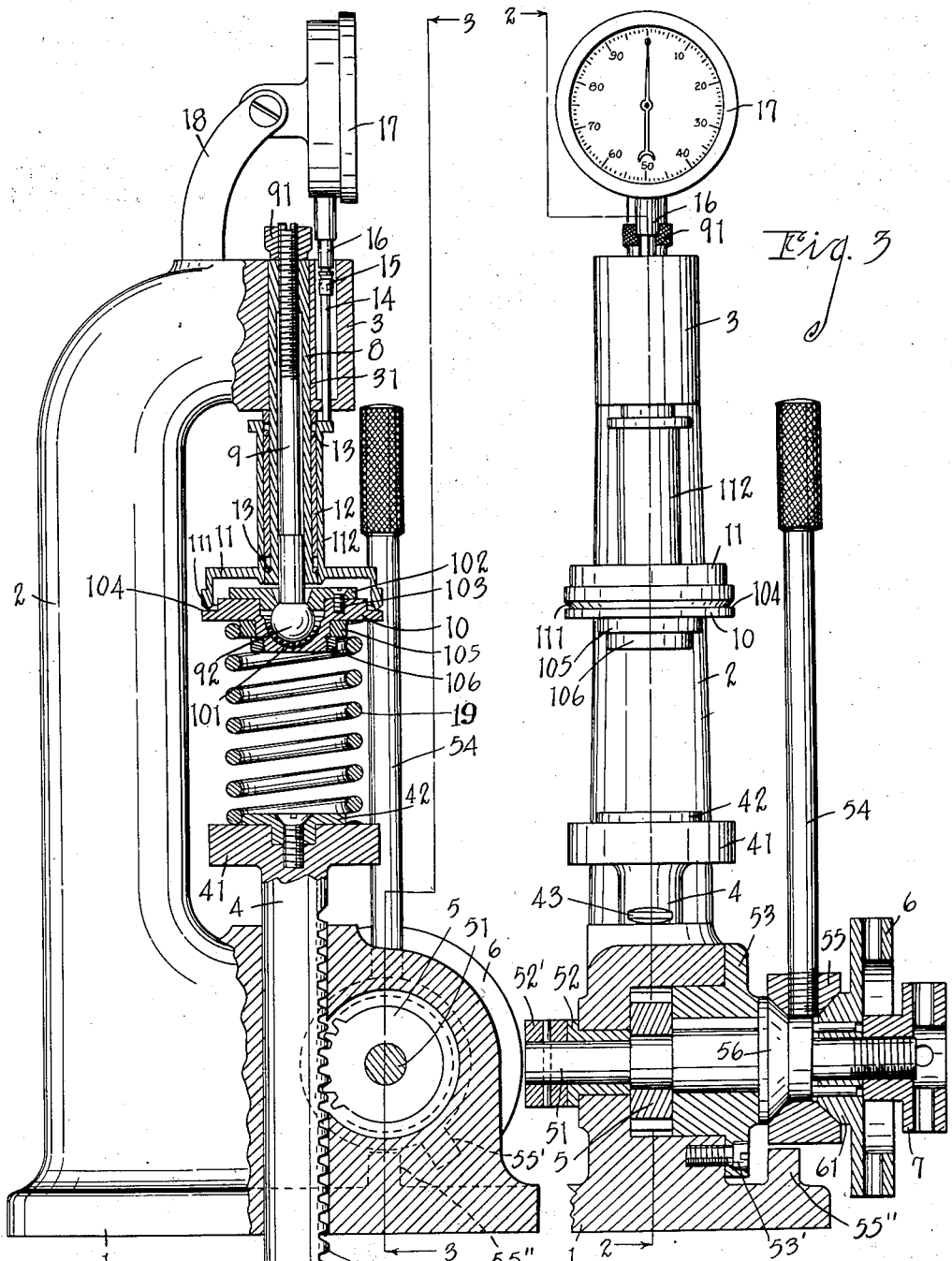
Fig. 2 is an enlarged detail elevation view partially in section on the plane of line 2—2 of Fig. 3.
Fig. 3 is a front elevation view partially in section on the plane of line 3—3 of Fig. 2.

The plunger 4 has a rack 43 formed therein, preferably cut therein. This is engaged by a pinion 5 carried on shaft 51. The shaft is disposed transversely through the base as seen in Fig. 3, being supported by bushing 52 at its outer end where it is provided with a suitable collar 52'. 53 is a removable bushing held in place by screw 53' and supporting the shaft. The shaft is provided with a disk or actuating hand wheel 6 which is clamped in place by lock nut 7, radial holes being provided in these parts for their ready operation by wrench, pin or otherwise. 54 is a rocking lever carried on collar 55 which is clamped in place on the shaft 51 against flange 56 by conical bearing 61 on the hand wheel 6. It will be seen that the plunger 4 is raised or lowered by the operation of the pinion 5. A suitable stop 55' is provided on the collar 55 to limit its motion by contact with stop 55'' on the base.

In a suitable bushing 8 vertically disposed in a bore 31 in the head 3 is the adjustable column 9. This is screw threaded at its upper end in the said bushing 8 and is locked securely in place by the lock nut 91. The lower end is in the form of a bearing ball constituting a member of a ball and socket universal joint.

10 is the swivel testing head provided with a socket bearing for the said ball 92, the same being provided with a quantity of anti-friction balls 101 and being retained in place by cap plate 102 retained in place by screw means 103. The swivel head 10 is provided with a perfectly true, upwardly facing flange 104. It is also provided with a detachable guide 105 for the top coil of a spring to be tested. This is held by screw nut or ring 106.

A cooperating gauge head 11 with downturned knife edged contacting rim 111 cooperates with the swivel test head 10. The gauge head 11 is carried by the sleeve 112 which fits and turns and slides upon the sleeve bearing 12 which is castellated at top and bottom to receive bearing balls 13. The sleeve 112 reciprocates and turns very freely on the sleeve and the said bearing balls. From the sleeve 112 extends upwardly a gauge plunger 14 which is provided at its upped end with a universal joint 15 which connects to the pitman 16 that operates the gauge 17. The said gauge is graduated to thousandths of an inch. It may be graduated in degrees and fractions. 18 is the bracket supporting the gauge. 19 is the spring or object to be tested.

When testing springs of any description, the gauge is adjusted to receive the springs at the maximum working pressure. The tester is first calibrated, preferably by using a true cylindrical block comparable with the spring dimension, so that it is known to be true. The plunger 4 is then lowered, the spring 19 to be tested is placed on the head 41 and adjusted accurately on the guide 42 and is then adjusted on the guide 105 on the swivel head 10. The machine having been previously set to enable the spring to be compressed to its maximum working pressure, the lever 54 is operated and pulled over against the stop 55''. If the spring is exactly true, the swivel plate 10 will not be tipped and the gauge will register zero. If, however, the spring is in the slightest particular out of true, one edge of the swivel plate 10 will be raised higher than the opposite edge. This shows angular reaction out of line with the central axis of the spring. As a result the swivel plate will tip (see the same exaggerated in Fig. 4) and in whichever direction it tips, on that side it will rise above the normal and lift the gauge head 11, thereby carrying up the sleeve 112 and the plunger 14 and actuating the pitman 16 which operates the gauge 17. The structure is so graduated that variations of a thousandth of an inch are registered on the scale.

We have not shown the details of the gauge as we deem that unnecessary to properly understand our invention.

We have shown the swivel test head 10 very much tipped in Fig. 4 to make clear its operation. In Fig. 5 we show the same swiveled plate with a simple ball bearing 20. In Fig. 6 we show the same thing with a point bearing 21, and in Fig. 7 we show the same thing with crossed knife edge bearings 22.

Having thus described our invention, what we claim as new and desire to secure by Letters Patent is:

1. In a spring tester, the combination of a base having a socket, a standard, a head supported by said standard, a plunger in said socket in said base and having a suitable head, a spring guide on said plunger head, a rack and pinion means for actuating the said plunger, an adjustable column in said standard head, a swivel test head having a trued upper surface and a spring contact surface opposed to said plunger, a universal joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

2. In a spring tester, the combination of a base having a socket, a standard, a head supported by said standard, a plunger in said socket in said base and having a suitable head, a spring guide on said plunger head, means for actuating the said plunger, an adjustable column in said standard head, a swivel test head having a trued upper surface and a spring contact surface opposed to said plunger, a universal knife edge joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

3. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal knife edge joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

4. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal knife edge joint connecting said test head to said column, a slide supported by said column, a head on said slide having a downturned contacting flange to cooperate with the trued upper surface of said swivel test head, a gauge having a support above the said column, and connections from the slide to said gauge to operate the same to register any angular deflection of the spring.

5. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal knife edge joint connecting said test head to said column, a slide supported by said column, a head on said slide having a downturned contacting flange to cooperate with the said swivel test head, a gauge having a support above the said column, and connections from the slide to operate the same to register any angular deflection of the spring.

6. In an apparatus for testing the distortional transmission of forces about the periphery of the end of a spring while the spring is compressed within its working range, the combination of a plunger having a suitable head adapted to receive one end of a spring, a cooperating test head adapted to receive the opposite end of a spring, a universal joint for said test head, a gauge, and connections from said gauge to the said test head to actuate said gauge to indicate universal angular deflections of said test head caused by the distortional forces exerted about the periphery of the end of a spring being tested.

7. In a spring tester, the combination of a base having a socket, a standard, a head supported by said standard, a plunger in said socket in said base and having a suitable head, a spring guide on said plunger head, a rack and pinion means for actuating the said plunger, an adjustable column in said standard head, a swivel test head having a trued upper surface and a spring contact surface opposed to said plunger, a universal cone point joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

8. In a spring tester, the combination of a base having a socket, a standard, a head supported by said standard, a plunger in said socket in said base and having a suitable head, a spring guide on said plunger head, means for actuating the said plunger, an adjustable column in said standard head, a swivel test head having a trued upper surface and a spring contact surface opposed to said plunger, a universal cone point joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

9. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal cone point joint connecting said test head to said column, a sleeve slide surrounding and supported by said column, a head on said sleeve slide having a downturned contacting flange to cooperate with the trued upper surface of said swivel test head, a gauge having a support above the said column, and connections from the sleeve slide to said gauge to operate the same to register any angular deflection of the spring.

10. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal cone point joint connecting said test head to said column, a slide supported by said column, a head on said slide having a downturned contacting flange to cooperate with the trued upper surface of said swivel test head, a gauge having a support above the said column, and connections from the slide to said gauge to operate the same to register any angular deflection of the spring.

11. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal cone point joint connecting said test head to said column, a slide supported by said column, a head on said slide having a downturned contacting flange to cooperate with the said swivel test head, a gauge having a support above the said column, and connections from the slide to operate the same to register any angular deflection of the spring.

12. In an apparatus for testing the distortional transmission of forces about the periphery of the end of a spring while the spring is compressed within its working range, the combination of a plunger having a suitable head adapted to receive one end of a spring, a cooperating test head adapted to receive the opposite end of a spring, means on said plunger and means on said test head to engage and center said spring, a universal joint for said test head, a stop to limit movement of said plunger toward said test head, a gage and connections from said gauge to the said test head to actuate said gage to indicate universal angular deflections of said test head caused by the distortional forces exerted about the periphery of the end of a spring being tested.

13. In an apparatus for testing the distortional transmission of forces about the periphery of the end of a spring while the spring is compressed within its working range, the combination of a plunger having a suitable head adapted to receive one end of a spring, a cooperating test head adapted to receive the opposite end of a spring, means on said plunger and means on said test head to engage and center said spring, a universal joint for said test head, a gage and connections from said gage to the said test head to actuate said gage to indicate universal angular deflections of said test head caused by the distortional forces exerted about the periphery of the end of a spring being tested.

14. In a spring tester, the combination of a base having a socket, a standard, a head supported by said standard, a plunger in said socket in said base and having a suitable head, a spring guide on said plunger head, a rack and pinion means for actuating the said plunger, an adjustable column in said standard head, a swivel test head having a trued upper surface and a spring contact surface opposed to said plunger, a universal joint connecting said test head to said column, a sleeve slide surrounding and supported by said column, a head on said sleeve slide to cooperate with the trued upper surface of said swivel test head, a gauge having a support above the said column, and connections from the sleeve slide to said gauge to operate the same to register any angular deflection of the spring.

15. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal joint connecting said test head to said column, a slide supported by said column, a head on said slide to cooperate with the said swivel test head, a gauge having a support above the said column, and connections from the slide to operate the same to register any angular deflection of the spring.

16. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a trued upper surface and a spring contact surface opposed to said plunger, a universal cone point joint connecting said test head to said column, a sleeve slide surrounding and supported by said column, a head on said sleeve slide to cooperate with the trued upper surface of said swivel test head, a gauge having a support above the said column, and connections from the sleeve slide to said gauge to operate the same to register any angular deflection of the spring.

17. In a spring tester, the combination of a base having a socket, a standard, a head supported by said standard, a plunger in said socket in said base and having a suitable head, a spring guide on said plunger head, means for actuating the said plunger, a column in said standard head, a swivel test head having a spring contact surface opposed to said plunger, a universal cone point joint connecting said test head to said column, a slide supported by said column, a head on said slide to cooperate with the said swivel test head, a gauge having a support above the said column, and connections from the slide to operate the same to register any angular deflection of the spring.

EDWARD W. BITZER.
HERBERT W. JOHNSON.